United States Patent
Ajri et al.

(10) Patent No.: US 11,120,179 B2
(45) Date of Patent: *Sep. 14, 2021

(54) SYSTEM AND METHOD FOR PERFORMING QUALITY CONTROL

(71) Applicant: James R. Glidewell Dental Ceramics, Inc., Newport Beach, CA (US)

(72) Inventors: Abhishek Babasaheb Ajri, Lake Forest, CA (US); Vaheh Golestanian Nemagrdi, Orange, CA (US); Marco Antonio Jokada, Diamond Bar, CA (US); David Christopher Leeson, North Tustin, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 15/928,484

(22) Filed: Mar. 22, 2018

(65) Prior Publication Data

US 2019/0294743 A1 Sep. 26, 2019

(51) Int. Cl.
  *G06F 30/23* (2020.01)
  *G05B 19/4099* (2006.01)
  *A61C 13/00* (2006.01)

(52) U.S. Cl.
  CPC ........... *G06F 30/23* (2020.01); *A61C 13/00* (2013.01); *G05B 19/4099* (2013.01); *G05B 2219/37205* (2013.01); *G05B 2219/45167* (2013.01); *G05B 2219/45172* (2013.01)

(58) Field of Classification Search
  CPC ...... G06F 30/23; A61C 13/00; G05B 19/4099
  USPC .......................................................... 703/6
  See application file for complete search history.

(56) References Cited

U.S. PATENT DOCUMENTS

| | | | | |
|---|---|---|---|---|
| 5,939,211 | A * | 8/1999 | Mormann | A61C 13/0022 428/542.8 |
| 6,525,819 | B1 * | 2/2003 | Delawter | A61B 5/0088 356/406 |
| 7,708,560 | B2 * | 5/2010 | Kraemer | A61C 13/0004 433/223 |
| 7,716,024 | B2 * | 5/2010 | Hultgren | G06T 19/20 703/6 |

(Continued)

OTHER PUBLICATIONS

Maria Averyanova (Quality Control of Dental Bridges and Removable Prostheses Manufactured Using Phenix Systems Equipment, AEPR'12, 17th European Forum on Rapid Prototyping and Manufacturing Paris, France, Jun. 12-14, 2012) (Year: 2012).*

(Continued)

*Primary Examiner* — Iftekhar A Khan
(74) *Attorney, Agent, or Firm* — Charles C. Fowler

(57) ABSTRACT

Disclosed are example embodiments of methods and systems for identifying and quantifying manufacturing defects of a manufactured dental prosthesis. Certain embodiments of the system for performing quality control on manufactured dental prostheses includes: an analysis module to best fit a scanned 3D data model of a manufactured dental prosthesis with a computer-aided design (CAD) model of the same manufactured dental prosthesis and to generate a differences model; and a quality controller to determine whether the manufactured dental prosthesis is a good or a defective product based on a statistical characteristic of the differences model.

26 Claims, 13 Drawing Sheets

(56) References Cited

U.S. PATENT DOCUMENTS

| | | | |
|---|---|---|---|
| 8,200,462 B2* | 6/2012 | Marshall | A61C 13/0004 703/6 |
| 8,568,897 B2* | 10/2013 | Ganley | A61C 13/08 428/542.8 |
| 8,640,338 B2* | 2/2014 | Jacquemyns | B23P 19/04 29/896.1 |
| 8,751,031 B2* | 6/2014 | Sager | A61C 8/0001 700/96 |
| 8,784,021 B2* | 7/2014 | Luksch | A61C 5/77 409/132 |
| 10,123,706 B2* | 11/2018 | Elbaz | A61B 5/0086 |
| 10,470,853 B2* | 11/2019 | Leeson | B23Q 3/061 |
| 10,682,210 B1* | 6/2020 | LaMar | A61C 8/008 |
| 2002/0021439 A1* | 2/2002 | Priestley | G01J 3/524 356/243.5 |
| 2003/0116299 A1* | 6/2003 | Embert | A61C 9/0046 164/4.1 |
| 2004/0136002 A1* | 7/2004 | Whaite | G01J 3/50 356/419 |
| 2004/0252303 A1* | 12/2004 | Giorgianni | G01J 3/508 356/402 |
| 2005/0008887 A1 | 1/2005 | Haymann et al. | |
| 2007/0154511 A1 | 7/2007 | Shastri et al. | |
| 2007/0154866 A1 | 7/2007 | Hall | |
| 2007/0172396 A1* | 7/2007 | Neeper | G01N 35/0099 422/400 |
| 2007/0190481 A1* | 8/2007 | Schmitt | A61C 19/04 433/68 |
| 2008/0015727 A1* | 1/2008 | Dunne | A61C 11/08 700/118 |
| 2008/0064008 A1* | 3/2008 | Schmitt | A61C 7/002 433/140 |
| 2008/0228303 A1* | 9/2008 | Schmitt | G05B 19/4097 700/98 |
| 2008/0241796 A1* | 10/2008 | Ce | A61C 5/77 433/215 |
| 2009/0133260 A1* | 5/2009 | Durbin | A61C 13/082 29/896.11 |
| 2009/0254299 A1* | 10/2009 | Tarazi | A61C 13/0001 702/137 |
| 2009/0258965 A1 | 10/2009 | Lassila et al. | |
| 2010/0105011 A1* | 4/2010 | Karkar | A61C 13/0004 433/215 |
| 2010/0281370 A1* | 11/2010 | Rohaly | G06F 3/04815 715/719 |
| 2011/0010187 A1* | 1/2011 | Andersson | G16H 70/20 705/2 |
| 2011/0050848 A1* | 3/2011 | Rohaly | H04N 13/00 348/43 |
| 2011/0306017 A1* | 12/2011 | Tanaka | A61K 6/813 433/203.1 |
| 2012/0308954 A1* | 12/2012 | Dunne | A61C 13/0013 433/57 |
| 2013/0174639 A1 | 7/2013 | Earthman et al. | |
| 2014/0308624 A1* | 10/2014 | Lee | A61C 9/0006 433/37 |
| 2015/0086939 A1* | 3/2015 | Fisker | A61C 13/0006 433/29 |
| 2015/0147585 A1* | 5/2015 | Schwarze | B42D 25/40 428/546 |
| 2015/0150655 A1* | 6/2015 | Frank | A61B 6/5247 433/29 |
| 2015/0151858 A1* | 6/2015 | Turzi | A61L 31/042 141/59 |
| 2015/0250568 A1 | 9/2015 | Fisker et al. | |
| 2015/0332018 A1* | 11/2015 | Rosen | G16H 10/40 705/2 |
| 2016/0100917 A1 | 4/2016 | Howe | |
| 2016/0147976 A1* | 5/2016 | Jain | A61J 1/035 705/2 |
| 2017/0000591 A1* | 1/2017 | Guillot | A61B 5/0088 |
| 2017/0156828 A1 | 6/2017 | Lesson et al. | |
| 2017/0265978 A1* | 9/2017 | Borotto | A61B 5/4542 |
| 2017/0340419 A1* | 11/2017 | Ohtake | G06K 9/6203 |
| 2017/0345147 A1* | 11/2017 | Ohtake | G06T 7/60 |
| 2018/0028413 A1 | 2/2018 | Craig et al. | |
| 2018/0206951 A1* | 7/2018 | O'Neill | A61C 9/004 |
| 2019/0126306 A1* | 5/2019 | Bakhshaei | B05B 12/004 |
| 2019/0130596 A1* | 5/2019 | Manafighazani | G06Q 10/087 |
| 2019/0318479 A1 | 10/2019 | Ajri et al. | |
| 2020/0051234 A1 | 2/2020 | Ajri et al. | |

OTHER PUBLICATIONS

Pompa et al. (Comparison of Conventional Methods and Laser-Assisted Rapid Prototyping for Manufacturing Fixed Dental Prostheses: An In Vitro Study, BioMed Research International vol. 2015, Article ID 318097, 7 pages) (Year: 2015).*

Gary L. Henkel, "A Comparison of Fixed Prosthesis Generated from Conventional vs Digitally Scanned Dental Impressions", Private Practice, Horsham, Pennsylvania, 2007, pp. 1-8.

* cited by examiner

| >=Min | <Max | # Points | % |
|---|---|---|---|
| -0.200 | -0.191 | 0 | 0.000 |
| -0.191 | -0.181 | 0 | 0.000 |
| -0.181 | -0.172 | 0 | 0.000 |
| -0.172 | -0.163 | 0 | 0.000 |
| -0.163 | -0.154 | 0 | 0.000 |
| -0.154 | -0.144 | 0 | 0.000 |
| -0.144 | -0.135 | 0 | 0.000 |
| -0.135 | -0.126 | 0 | 0.000 |
| -0.126 | -0.116 | 0 | 0.000 |
| -0.116 | -0.107 | 0 | 0.000 |
| -0.107 | -0.098 | 0 | 0.000 |
| -0.098 | -0.089 | 0 | 0.000 |
| -0.089 | -0.079 | 0 | 0.000 |
| -0.079 | -0.070 | 0 | 0.000 |
| -0.070 | -0.061 | 5 | 0.011 |
| -0.061 | -0.051 | 136 | 0.311 |
| -0.051 | -0.042 | 492 | 1.126 |
| -0.042 | -0.033 | 1255 | 2.872 |
| -0.033 | -0.024 | 3046 | 6.971 |
| -0.024 | -0.014 | 5266 | 12.051 |
| -0.014 | -0.005 | 6017 | 13.770 |
| -0.005 | 0.005 | 7532 | 17.237 |
| 0.005 | 0.014 | 8113 | 18.567 |
| 0.014 | 0.024 | 6434 | 14.724 |
| 0.024 | 0.033 | 3185 | 7.289 |
| 0.033 | 0.042 | 1202 | 2.751 |
| 0.042 | 0.051 | 467 | 1.069 |
| 0.051 | 0.061 | 296 | 0.677 |
| 0.061 | 0.070 | 169 | 0.387 |
| 0.070 | 0.079 | 74 | 0.169 |
| 0.079 | 0.089 | 7 | 0.016 |
| 0.089 | 0.098 | 0 | 0.000 |
| 0.098 | 0.107 | 0 | 0.000 |
| 0.107 | 0.116 | 0 | 0.000 |
| 0.116 | 0.126 | 0 | 0.000 |
| 0.126 | 0.135 | 0 | 0.000 |
| 0.135 | 0.144 | 0 | 0.000 |
| 0.144 | 0.154 | 0 | 0.000 |
| 0.154 | 0.163 | 0 | 0.000 |

510 brackets rows from -0.042 to 0.051

*FIG. 5B*

| >=Min | <Max | # Points | % |
|---|---|---|---|
| -0.400 | -0.381 | 0 | 0.000 |
| -0.381 | -0.363 | 22 | 0.025 |
| -0.363 | -0.344 | 905 | 1.029 |
| -0.344 | -0.326 | 1132 | 1.287 |
| -0.326 | -0.307 | 689 | 0.783 |
| -0.307 | -0.289 | 472 | 0.536 |
| -0.289 | -0.270 | 463 | 0.526 |
| -0.270 | -0.251 | 408 | 0.464 |
| -0.251 | -0.233 | 366 | 0.416 |
| -0.233 | -0.214 | 303 | 0.344 |
| -0.214 | -0.196 | 329 | 0.374 |
| -0.196 | -0.177 | 309 | 0.351 |
| -0.177 | -0.159 | 352 | 0.400 |
| -0.159 | -0.140 | 413 | 0.469 |
| -0.140 | -0.121 | 521 | 0.592 |
| -0.121 | -0.103 | 527 | 0.599 |
| -0.103 | -0.084 | 710 | 0.807 |
| -0.084 | -0.066 | 805 | 0.915 |
| -0.066 | -0.047 | 1467 | 1.667 |
| -0.047 | -0.029 | 4560 | 5.182 |
| -0.029 | -0.010 | 16750 | 19.036 |
| -0.010 | 0.010 | 31466 | 35.761 |
| 0.010 | 0.029 | 11492 | 13.061 |
| 0.029 | 0.047 | 4156 | 4.723 |
| 0.047 | 0.066 | 2130 | 2.421 |
| 0.066 | 0.084 | 1093 | 1.242 |
| 0.084 | 0.103 | 659 | 0.749 |
| 0.103 | 0.121 | 349 | 0.397 |
| 0.121 | 0.140 | 249 | 0.283 |
| 0.140 | 0.159 | 233 | 0.265 |
| 0.159 | 0.177 | 254 | 0.289 |
| 0.177 | 0.196 | 256 | 0.291 |
| 0.196 | 0.214 | 437 | 0.497 |
| 0.214 | 0.233 | 393 | 0.447 |
| 0.233 | 0.251 | 507 | 0.576 |
| 0.251 | 0.270 | 610 | 0.693 |
| 0.270 | 0.289 | 1042 | 1.184 |
| 0.289 | 0.307 | 741 | 0.842 |
| 0.307 | 0.326 | 354 | 0.402 |

*FIG. 6B*

SYSTEM AND METHOD FOR PERFORMING QUALITY CONTROL

TECHNICAL FIELD

The disclosure relates generally to the field of quality control, specifically and not by way of limitation, some embodiments are related to automatically performing quality control on manufactured dental prostheses.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored either as a crown, inlay, onlay, or veneer. The prepared tooth and its surroundings are then scanned by a three dimensional (3D) imaging camera and uploaded to a computer for design. Alternatively, a dentist can obtain an impression of the tooth to be restored and the impression may be scanned directly, or formed into a model to be scanned, and uploaded to a computer for design.

Dental prostheses are typically manufactured at specialized dental laboratories that employ computer-aided design (CAD) and computer-aided manufacturing (CAM) milling systems to produce dental prostheses according to patient-specific specifications provided by dentists. In a typical work flow, information about the oral situation of a patient is received from a dentist, and the dentist or dental laboratory designs the dental prosthesis. Where the prosthesis is milled from a block of material, a material block having a size, shape, color, and material-type properties suitable for creating the prosthesis is selected.

After the milling process, the milled material blocks are cleaned. Subsequent to the cleaning process, the milled material blocks are manually transferred, inspected, and logged from the milling and cleaning processes to a sintering tray in preparation for the glazing process. A final inspection process may be performed after the sintering process. Conventionally, the final inspection process is done manually. In other words, each manufactured dental prosthesis is visually inspected by a quality control (QC) personnel. However, certain defects such as improper size (i.e., too small or too large) and milling defects such as steps are very hard to visually detect. Even the most well-trained and seasoned QC personnel will have a hard time detecting these types of defects. Additionally, even if the QC personnel can detect a step or a fitting issue, it is virtually impossible for the QC personnel to quantify the error. The failure to quantify the defects make it very difficult for QC engineers to take corrective actions. Accordingly, what is needed is a system and method for performing quality control by identifying and quantifying manufacturing defects of dental prostheses.

SUMMARY

Disclosed are example embodiments of methods and systems for identifying and quantifying manufacturing defects of a manufactured dental prosthesis. Certain embodiments of the system for performing quality control (identifying and quantifying manufacturing defects) on manufactured dental prostheses comprises: an analysis module to best fit a scanned 3D data model of a manufactured dental prosthesis with a computer-aided design (CAD) model of the same manufactured dental prosthesis and to generate a differences model; and a quality controller to determine whether the manufactured dental prosthesis is a good or a defective product based on a statistical characteristic of the differences model.

A statistical characteristic can be a differences distribution. A difference can be an offset between a point in the CAD model and the corresponding best-fitting point in the scanned 3D model of the manufactured dental prosthesis. In a perfect match, the offset is zero.

In some embodiments, the quality controller can trim the differences model to exclude certain parts of the difference model. For example, the top and bottom portions of the differences model can be excluded from the statistical analysis. The top portion can include the occlusal portion of the prosthesis model and the bottom portion can be a small portion of the prosthesis that is near the gum line of the patient once the prosthesis is installed. In some embodiments, the top and bottom portions of the CAD and scanned 3D data model of the manufactured dental prosthesis can be trimmed prior to performing the best fit.

The quality controller can determine that the manufactured dental prosthesis is a good part when all offsets within ±(plus or minus) 50 microns account for greater than 75%, such as greater than 80%, or such as greater than 85% of all points in the differences model. In other words, all offsets in the differences model that are greater than ±50 microns must account for less than 25%, such as less than 20%, or such as less than 15% of all total offset data points, including zero offset data points. It should be noted that the ±50 microns threshold can be adjusted for different types of product and/or patients, or for different acceptable tolerance standards. For example, the threshold can be ±30 microns, or ±70 microns.

In some embodiments, the quality controller can determine that the manufactured dental prosthesis is a good part when all offsets within ±50 microns account for greater than 85% of all points in the differences model and all offsets greater than ±88 microns account for less than 1% of all points in the differences model. It should also be noted that the second threshold of ±88 microns can be adjusted for different types of product and/or patients, or for other acceptable tolerance standards. For example, the second threshold can be ±75 microns or less (e.g., 65 microns, 55 microns, or 45 microns), or ±100 microns or more (e.g., 115 microns, 130 microns, or 145 microns).

In some embodiments, the analysis module can be further configured to: determine a contact surface on the manufactured dental prosthesis that will be in contact with an adjacent tooth using the CAD model; determine whether points on the contact surface are within tolerance using the differences model; and reject the manufactured prosthesis based on a percentage of points outside of a predetermined tolerance.

In some embodiments, the quality controller can determine that the manufactured dental prosthesis is either too small or large based on the distribution of differences. If the distribution is negatively biased, when compared to a normal distribution, the manufactured dental prosthesis can be deemed too small. If the distribution is positively biased, when compared to a normal distribution, the manufactured dental prosthesis can be deemed too large.

The quality controller can also determine that the manufactured dental prosthesis has a step when a distribution of differences includes peaks at a left and/or right side of a normal distribution curve.

The system may further include a scanner for scanning the manufactured dental prosthesis and for generating the scanned 3D data model. The scanner can use light having a wavelength between 400-500 nm to scan the manufactured dental prosthesis.

In yet another embodiments, a method for performing quality control on manufactured dental prostheses is disclosed. The method comprises: scanning the manufactured dental prosthesis to generate a scanned 3D data model; generating a differences model by comparing the scanned 3D data model of the dental prosthesis with a computer-aided design (CAD) model of the same manufactured dental prosthesis; and determining whether the manufactured dental prosthesis is a good or a defective product based on a statistical characteristic of the differences model.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 5B is a spreadsheet listing the offsets distribution of the differences model of FIG. 5A.

FIG. 6B is a spreadsheet listing the offsets distribution of the differences model of FIG. 6A.

DETAILED DESCRIPTION

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Overview

Figure 1:
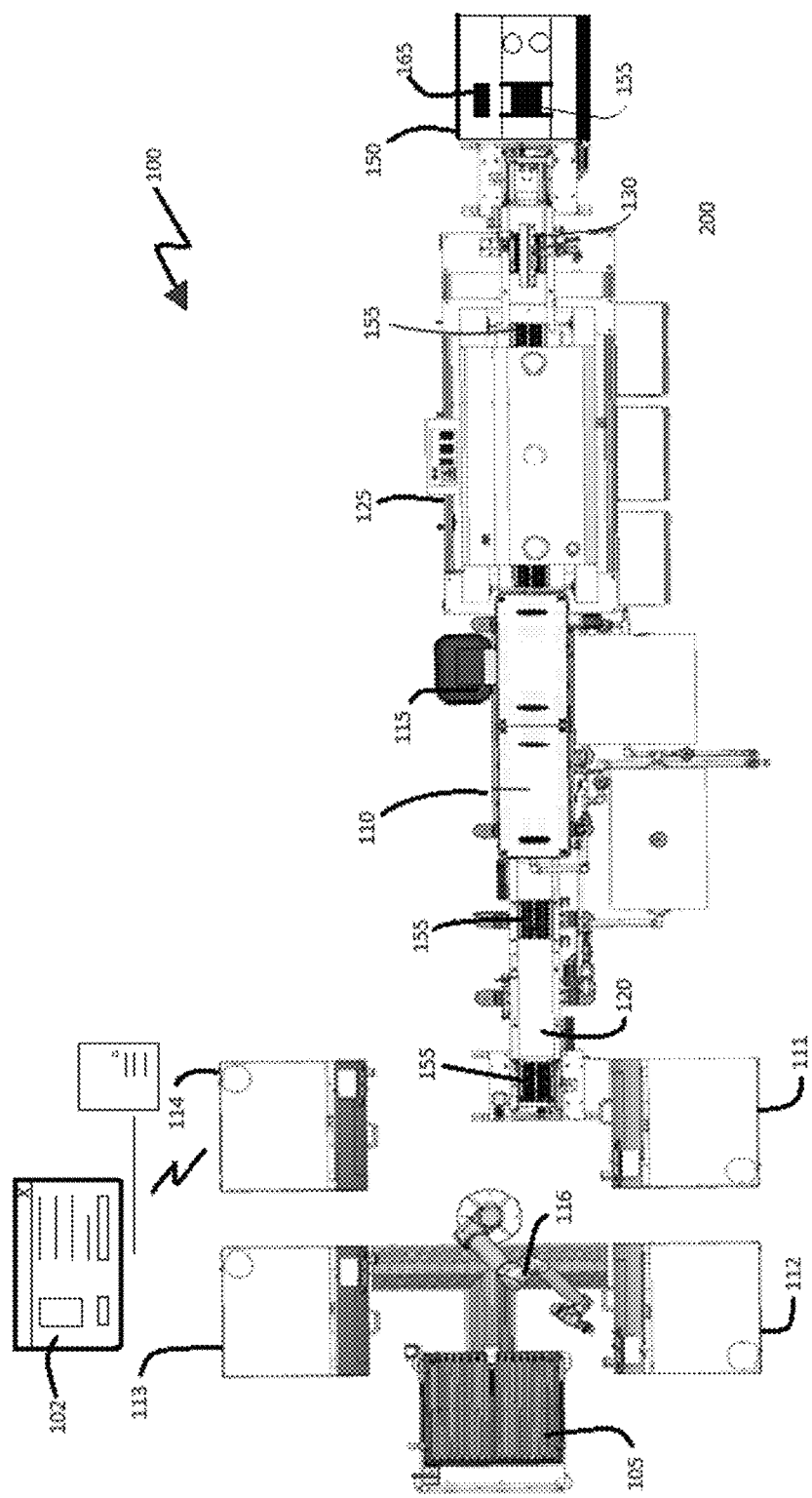
FIG. 1 is a high-level block diagram of a system for manufacturing dental prosthesis in accordance with some embodiments of the present disclosure.

To better understand the quality control process, an overview of an exemplary dental prosthesis manufacturing process is provided. FIG. 1 illustrates a system 100 for manufacturing custom designed dental prostheses in a continuous automated process in accordance with some embodiments of the disclosure. Information concerning custom dental prostheses can be received by a dental prosthesis management system 102 that is in communication with an automated manufacturing system 100. Dental prosthesis management system 102 can be locally or remotely located. Additionally, one or more functionalities (modules) of dental prosthesis management system 102 can reside locally or remotely. For example, a local tracking and inspection module can be part of dental prosthesis management system 102, and a plurality of dentition databases (not shown) can be located on the cloud.

System 100 includes a plurality of process stations such as a milling center 105, a separating station 110, a scrap disposal station 115, and a transfer and inspection/tracking station 150. Milling center 105 can mill material blocks and form custom dental prostheses according to design specifications, which can be obtained from dental prosthesis management system 102. Separating station 110 is provided for separating workpieces into milled custom dental prostheses and remnant material blocks. Scrap disposal station 115 can be provided to remove and eliminate remnant material blocks from further processing.

System 100 may include a transfer system, such as a conveyor system 120 that comprises one or more conveyor units, automatically and/or simultaneously transfers a plurality of custom dental prostheses between remaining, post-milling process stations. Each process station may comprise a different transfer unit, or a different conveyor suitable to the environmental conditions of the process. Optionally, additional process stations may be included in the automated system, including an oven 125 for thermal treatment, and a cooling unit 130.

A carrier or container 155 may be provided to move material blocks and dental restorations between processing units. In one embodiment, container 155 may have a structure that is configured to interface with each process station, including individual pockets or compartments to separate and track a plurality of custom milled workpieces for simultaneous processing into custom dental prostheses in a hands-free and automated process. Container 155 can include a plurality of pockets to hold a plurality of workpieces in a specified location and orientation for processing through the plurality of process stations. Each station, such as separating unit 110 and scrap disposal unit 115, may comprise devices having components in spaced arrangements that align with the tray pockets and with the orientation of workpieces held within the pockets. The assignment of an individual workpiece to a specific tray pocket isolates each workpiece and identifies the custom dental prostheses throughout the automated process until removal of the prostheses from the tray, for accurate association of each custom dental prosthesis with corresponding dental prosthesis information.

Dental prosthesis management system 102 may receive dental prosthesis information associated with a proposed custom dental prosthesis to be processed by milling center 105.

Dental prosthesis management system 102 may comprise a system capable of performing tasks related to the manufacture of dental prostheses, and can be implemented on a computer system, such as a server. Dental prosthesis management system 102 may include a module for selecting dental prostheses, a machining instructions tool, one or more cameras, one or more sensors, and a dental prosthesis database. The machining instructions tool, in turn, may include more than one database for storing information related to the modules or materials used within the system and information pertaining to the custom dental prosthesis, and machining instructions. Databases may be internal to dental prosthesis management system 102, located on an external device connected to dental prosthesis management system 102, or located remotely, such as in cloud-based storage.

Information used to design and/or manufacture a dental prosthesis for a patient may be received by dental prosthesis management system 102 from a dentist or dental office. In some representative examples, a dentist or dental office will provide information concerning the oral situation of a patient, such as a physical impression or an electronic file containing a digital scan of the patient's oral situation. Additionally, the dentist or dental office may also provide instructions for the material or materials to be used to manufacture the prosthesis, the type and construction of the prosthesis, the shade or other aesthetic features for the prosthesis, and the like. As used herein, the term "dental prosthesis" refers to any dental restorative including, without limitation, crowns, bridges, dentures, partial dentures, implants, onlays, inlays, or veneers.

In some embodiments, information regarding the selected material block is used for calculating machining instructions, and is stored in a database of dental prosthesis management system 102. For example, material blocks that undergo dimensional reduction after milling and sintering are associated with material-specific information in order to accurately calculate machining instructions to derive the dimensions of an enlarged prosthesis milled from a pre-sintered block. The information regarding the material properties of the specific material that is used in the milling calculations may be associated with the material, and stored in a data base until the material block is selected and the information is retrieved.

After all machining steps are completed, the workpiece may be removed from the mill manually, or by a robotic handler 116. In one embodiment, robotic handler 116 loads a plurality of custom workpieces from a single mill or a plurality of mills (e.g., mills 112, 113, 114, and 115) onto container 155.

Quality Control

System 100 can include one or more quality control stations 200. For example, quality control station 200 can be placed immediately after the milling process to determine whether the milled dental prosthesis is of proper size (taken into account the enlargement factor of the milling block) or has milling defects such as steps. Quality control station 200 can also be placed after the sintering process, this allows quality control station 200 to check the final size (and other parameters) of the dental prosthesis after the sintering process. Alternatively, quality control station 200 can be placed both locations—after the milling and sintering processes.

Quality control station 200 can also be communicatively linked to dental prosthesis management system 102. This enables quality control station 200 to determine the enlargement factor (EF) of the milling block that will be used to form a dental prosthesis. Taking the EF factor into account, quality control station 200 can determined whether a milled dental prosthesis is of the proper size. For example, if quality control station 200 determines that the milled dental prosthesis has the same size (or smaller) as the CAD model (received from dental prosthesis management system 102) of the same dental prosthesis, then the part can be flagged for inspection and/or rejection. In this way, the defective-milled dental prosthesis does not have to go through the sintering process.

The sintering process starts at transfer-tracking station 150, where one or more milled dental prostheses are transferred to a sintering tray 165. As mentioned, quality control station 200 can also be placed after the sintering process in order to perform quality control on the sintered dental prosthesis. In this way, various defects such as improper size, cracks, chips, steps, etc., can be detected and quantified. In some embodiments, system 100 can have two quality control stations, one after the milling process and one after the sintering process.

Figure 2:
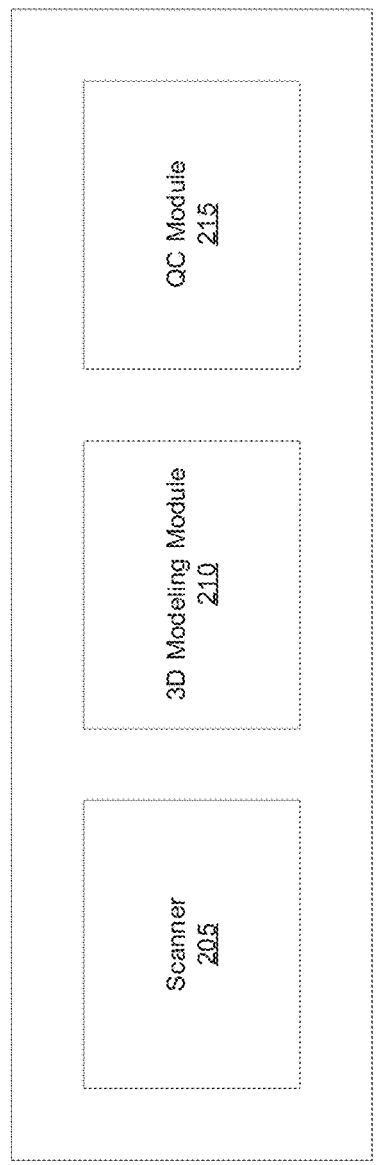
FIG. 2 is a block diagram of a quality control system in accordance with some embodiments of the present disclosure.

FIG. 2 illustrates the quality control station 200 in accordance with some embodiments of the present disclosure. Quality control station 200 includes a scanner 205, a 3D modeling module 210, and a QC module 215. Scanner 205 can be a contact or non-contact inspection device that can generate a 3D data model of the scanned object. Scanner 205 can use light or radio waves to scan a dental prosthesis. In some embodiments, the light used to scan the dental prosthesis can have a wavelength range between 400-500 nm. Because a finished dental prosthesis is glazed, it can be semi-translucent and thereby can affect the way light is reflected. To address this issue, in one embodiment, the dental prosthesis can be pre-heated so that it will emits radiation in the infrared (IR) region of the radio spectrum. In this embodiment, scanner 205 can use light with wavelength in the IR region to scan the pre-heated dental prosthesis.

Scanner 205 can generate a 3D data set of the scanned dental prosthesis in a stereolithography CAD format known as STL. Scanner 205 can also generate other types of 3D data set format such as 3DS, BLEN, SCL, SKP, or any other type of format as required by 3D modeling module 210.

3D modeling module 210 can include 2D/3D best-fitting algorithms to best-fit spatial points of a CAD data set of a dental prosthesis to the corresponding best-fitting spatial points of the scanned 3D data set of the same dental prosthesis. 3D modeling module can also generate a differences model based on the best-fitting results. A differences model can have the same number of spatial data points as the CAD and/or scanned 3D data set. In the differences model, each data point can be an offset between the CAD data set and the scanned 3D data set. A zero offset means that the point in the scanned 3D data set is in the exact location as the corresponding best-fitting point in the CAD data set. In other words, if the differences model comprises of all zero offset points, then the scanned 3D data set is exactly the same as the CAD data set.

QC module 215 can analyze the differences model to determine the types of defects present in the manufactured dental prosthesis. QC module 215 can also quantify the defects by quantifying the amount or severity of the defects. Exemplary types of defects include improper size, chips, cracks, steps, indentations, etc. Some defects such as cracks and chips can be visible to the human eye. However, defects such as improper size, small indentations, and steps can be very difficult (if not impossible) to visually detect with the human eye. For example, a crown can be too small just by 50 microns under the tolerance. This type defect would be almost impossible to perceive by a human inspector. An alternative manual inspection method is to use a vernier caliper to check the size of the crown at various locations. However, this would be very inefficient and costly in term of the human hours required. In another example, a dental prosthesis can have a step having a height of 50 microns. Even though the resolution of the human eye is higher than 50 microns, a step of this size is extremely hard to spot because it can blend in with the surrounding surfaces of the dental prosthesis. In some embodiments, a step of 30 microns is acceptable.

In some embodiments, QC module 215 can determine whether the scanned dental prosthesis is a good or defective part based on the distribution of offsets of the differences model. For example, in a good part, all of the offsets have a distribution that is similar to a normal distribution. In a defective part, the distribution of the offsets is biased in the negative or positive direction. A negative direction is toward the negative side from the center of the normal distribution. Alternatively, a defective part can have a distribution with one or more peaks in the negative or positive direction. In this way, QC module 215 can determine whether a part is too small or large or whether it has steps. A more detailed discussion on statistical analysis is provided below.

It should be noted that one or more functions and/or features of 3D modeling module 210 and QC module 215 can be integrated into scanner 205. Similarly, one or more functions of QC module 215 can be integrated into 3D modeling module 210 or vice versa. For example, if all functions and/or features of 3D modeling module 210 and QC module 215 are integrated into scanner 205, then scanner 205 can also generate the differences model and perform statistical analysis on the differences model to determine whether a manufactured dental prosthesis is a good or defective part.

Figure 3:
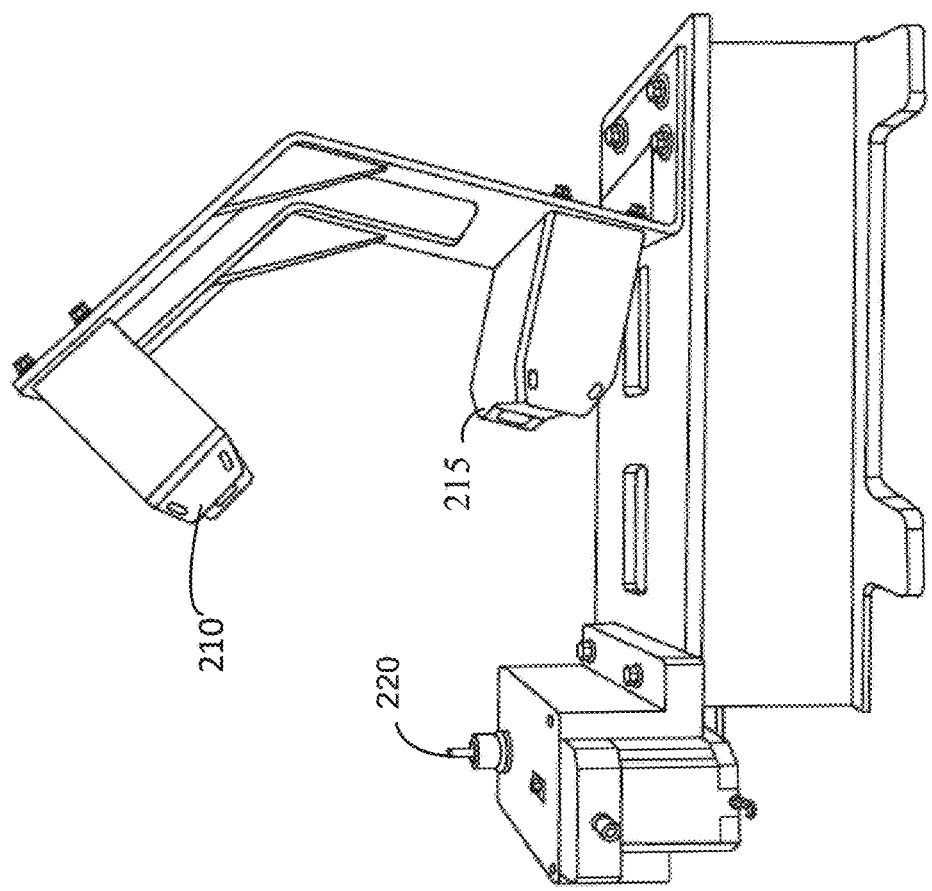
FIG. 3 illustrates a scanner in accordance with some embodiments of the present disclosure.

FIG. 3 illustrates scanner 205 in accordance with some embodiments of the present disclosure. Scanner 205 includes one or more sensors 210 and 215 and a rotatable holder 220. Each of the sensors can use blue light, which can have a wavelength between 450-495 nm. It should be noted that other wavelengths can also be used by scanner 205. In some embodiments, scanner 205 can have two sensors. The first sensor 210 can scan the dental prosthesis from the top at approximately 45 degrees angle. The second sensor 215 can scan the dental prosthesis from a negative angle with respect to the main horizontal surface of scanner 205. The negative scanning angle can range between 15-30 degrees. By having sensors 210 and 215 positioned at a positive and negative angles, an accurate scan can be achieved.

Rotatable holder 220 can be air actuated to open up its fingers to hold the inside of a dental prosthesis. For example, a dental crown prosthesis typically has a void in the center. The void is where the dental crown will be installed to a prepared site having a corresponding tooth structure to mate with the void. The dental crown can be secured to the rotatable holder by having the fingers of the rotatable holder open outward and pressing against the inside wall of the void. Alternatively, the dental crown can be held in place using putty and/or adhesive.

Rotatable holder 220 can rotate 30 degrees or more for each scanning cycle. For example, rotatable holder 220 can rotate by 30 degrees 12 times in order to achieve a full rotation. After each rotation, rotatable holder 220 can pause for several seconds to allow sensors 210 and 215 to fully scan the section facing the sensors. In another example, rotatable holder 220 can rotate by 60 degrees 6 times or by 90 degrees 4 times, etc.

Figure 4B:
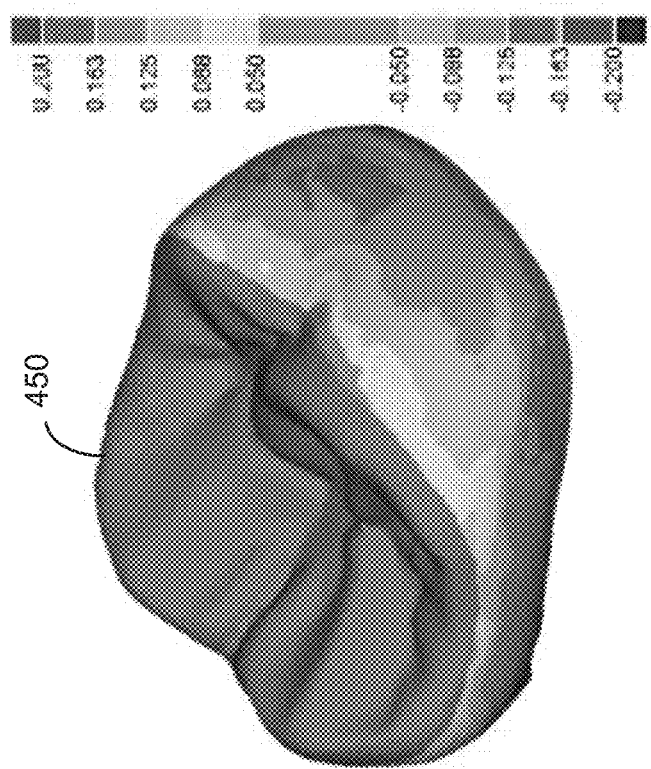
FIGS. 4A and 4B illustrate examples of differences models of two different dental prostheses in accordance with some embodiments of the present disclosure.
Figure 4A:
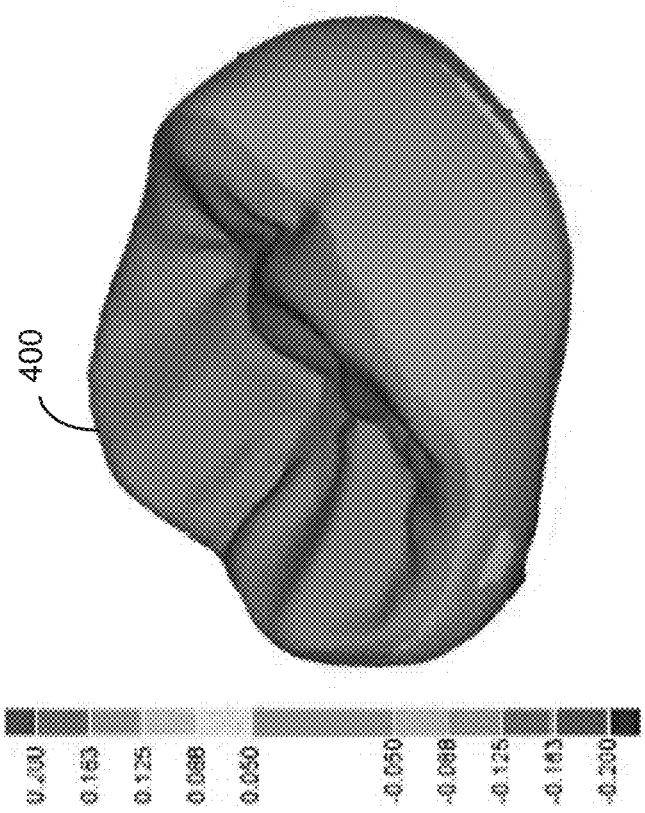

FIGS. 4A and 4B are examples differences model generated by 3D modeling module 210 in accordance with some embodiments of the present disclosure. FIG. 4A illustrates a differences model of a good manufactured dental prosthesis 400, which is indicated by the color green. Points within the green region have a small offset that is within a predetermined tolerance (e.g., ±50 microns). In other words, the offsets between points in the CAD data set and the corresponding best-fitting points on the scanned 3D data set are below a given tolerance threshold in the green region. The tolerance threshold can range between 30 to 70 microns, depending upon the dental prosthesis being manufactured and patient's specification. In FIG. 4A, manufactured dental prosthesis 400 can be considered to be a good part when 70-90% (e.g., 75%, or 80%, or 85%) of the offsets (including zero offset) are within the tolerance threshold of ±50 microns. In some embodiments, QC module 215 can identify a manufactured dental prosthesis to be a good part when 85% or more of the offsets are within the tolerance threshold. Additionally, QC module 215 can require that all offsets greater than ±80-95 microns must account for less than a threshold percentage (e.g., 5%, or 3%, or 1%) of the differences distribution. In other words, as an example using a 1% threshold, out of 50,000 data points (offsets) in the differences model, there can be no more than 500 offsets greater than 80-95 microns. In some embodiments, all offsets greater than ±88 microns must account for less than 1% of the differences distribution in order for the manufactured dental prosthesis to be considered a good part.

The ±50 microns tolerance threshold and the 85% percentage threshold are determined based on empirical statistical studies to provide a balance of high quality and high yield rate. As noted, both the tolerance and percentage thresholds can be adjusted to meet 3-sigma engineering tolerances as required. For example, the percentage threshold can be adjusted to 95.45% to meet 3-sigma quality requirements. Additionally, the second tolerance threshold of ±88 microns is also selected based on empirical statistical studies to achieve high quality and high yield rate. Per 3-sigma requirements, in some embodiments, the second tolerance threshold can be adjusted to ±75 microns.

FIG. 4B illustrates an exemplary differences model of a manufactured dental prosthesis 450 that fails quality control. As indicated by the color legend, a substantial number of points on dental prosthesis 450 are outside of the tolerance threshold of ±50 microns. Specifically, dental prosthesis have a substantially number of points above +88 microns. This indicates that dental prosthesis 450 is too large. This could mean there is an error in the milling process, the sintering process, the EF calculation process, or a combination thereof. In some embodiments, an EF variation of ±30 microns is acceptable.

Figure 5A:
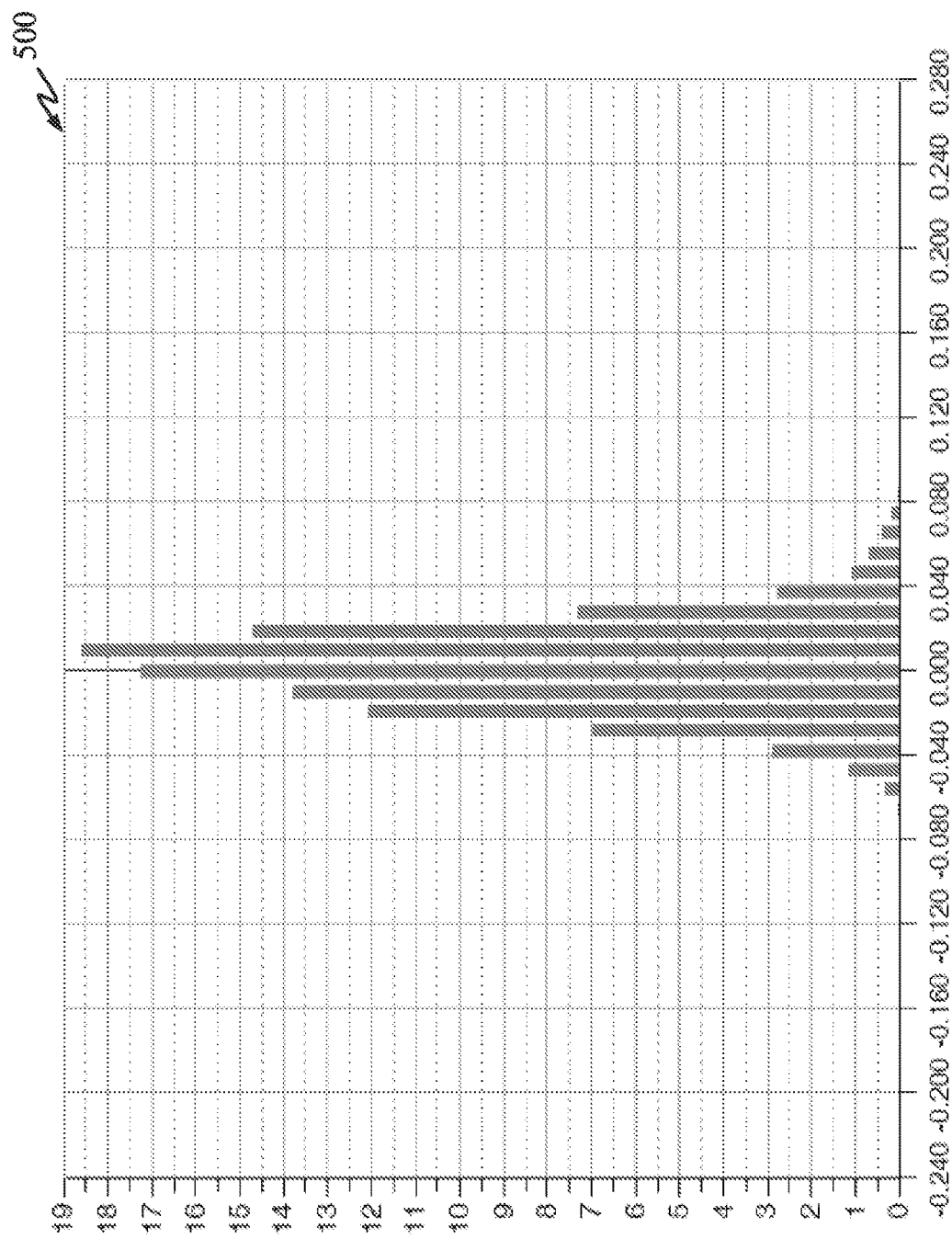
FIG. 5A is a graph illustrating the offsets distribution of a differences model in accordance with some embodiments of the present disclosure.

FIG. 5A illustrates an example distribution 500 of differences or offsets of dental prosthesis 400 that passes quality control. As illustrated, distribution 500 has a normal distribution where substantially all of the differences are within ±40 microns. This is well within the tolerance threshold of ±50 microns. Additionally, distribution 500 has a normal bell curve shape without any peaks at the outer edges (i.e., left and right sides of the bell curve). FIG. 5B is a spreadsheet listing the difference values of all sampling points in distribution 500. In FIG. 5B, the ±50 microns range is indicated by bracket 510. The total number of points within ±50 microns is over 94% of the total number of points. Each point is a difference (or offset) between a point in the CAD data set and the corresponding best-fitting point in the scanned 3D data set.

QC module 215 can analyze the distribution of differences to determine whether a part is good or defective. Prior to analyzing the distribution of offsets of the differences models, QC module 215 can eliminate a certain portions of the differences model from analysis. For example, QC module 215 can eliminate the top portion of a dental prosthesis. In a crown, the top portion is near the occlusal surface of the crown. QC module 215 can also eliminate a bottom portion of the crown proximal to the margin line (the bottom portion of the crown near the gum line of the patient once the crown is mounted). By eliminating the top and bottom portions from analysis, a reliable band of data (in the middle of the crown) can be generated. In this way, a more accurate statistical analysis can be performed. See FIGS. 9 and 10 for more discussion on the elimination of the top and bottom portions to create a reliable band of data.

In some embodiments, the percentage threshold is 85% and the tolerance threshold is ±50 microns. In other words, if 85% of all points are within ±50 microns, then the part can be considered to be a good part. The percentage threshold can range between 75% to 96%, depending upon the type of dental prosthesis to be manufactured, the milling block material, patient's specifications, etc. The tolerance threshold can have a range between 30 to 70±microns.

In some embodiments, QC module 215 can require a dental prosthesis to pass two sets of percentage and tolerance thresholds. The first set of percentage-tolerance thresholds can require all points within ±50 microns must account for greater than 85% of the total number of points. The second set of percentage-tolerance thresholds can require all points greater than ±88 microns must account for less than 1% of the total number of points. Thus, in order to pass quality control, a manufactured dental prosthesis must meet both sets of percentage-tolerance thresholds. For example, if a dental prosthesis meets the first set of percentage-tolerance threshold but fails the second set, then it can be classified as a defective part. It should be noted that a distribution of a differences model such as distribution 500 can be generated by 3D modeling module 210 and/or QC module 215.

Figure 6A:
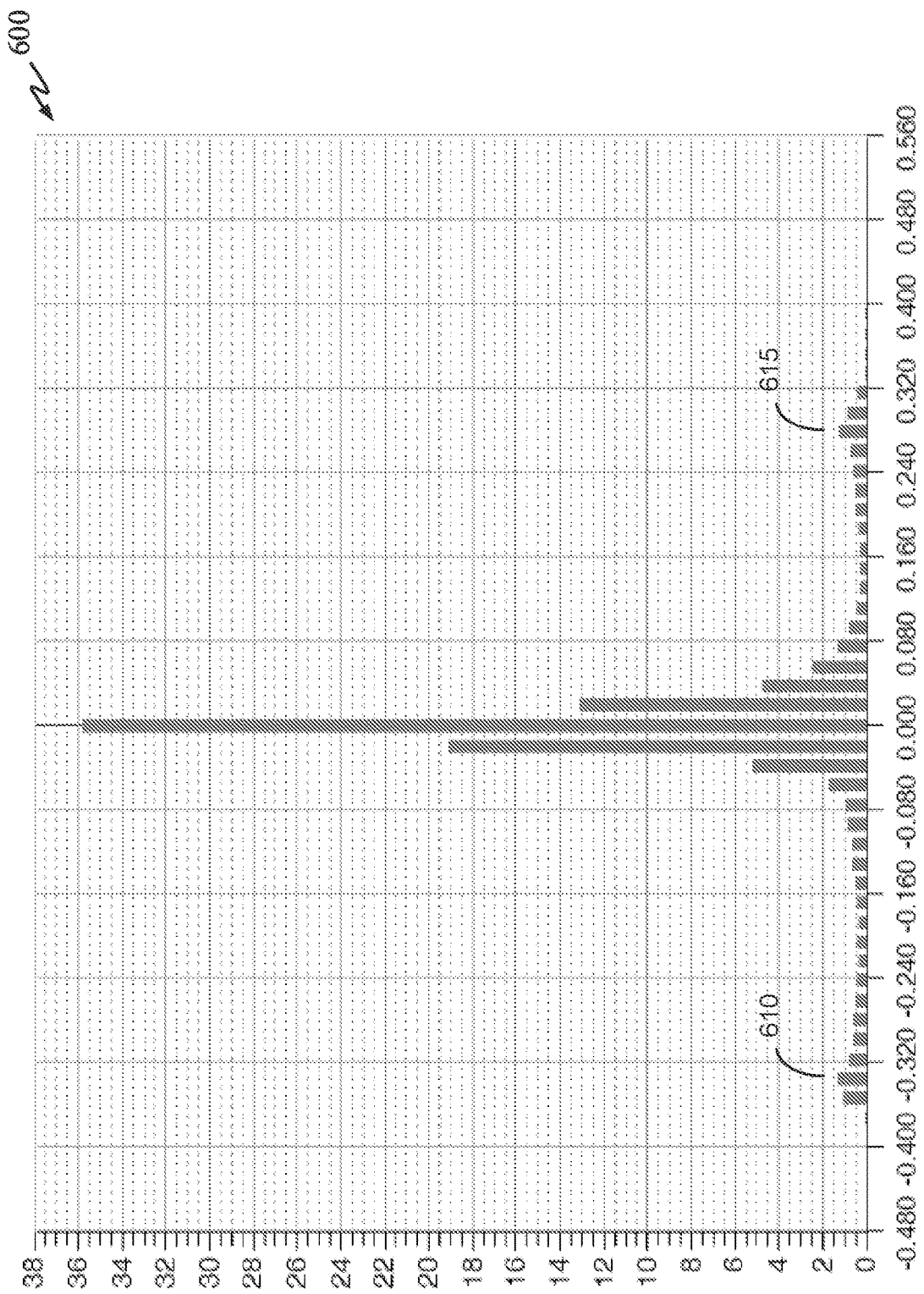
FIG. 6A is a graph illustrating the offsets distribution of a differences model in accordance with some embodiments of the present disclosure.

FIG. 6A illustrates an example distribution 600 of a differences model of dental prosthesis 450 that fails quality control. In distribution 600, the majority of the offsets fall between ±80 microns. Referring to FIG. 6B, which is a spreadsheet listing all offsets in distribution 600, approximately 79% of all points fall within the tolerance threshold of ±50 microns as indicated by bracket 620. This alone can result in the dental prosthesis being classified as a defective part. Additionally, distribution 600 includes two outer peaks 610 and 615 in FIG. 6A. This can indicate a step on the surface of dental prosthesis 450.

Referring again to FIG. 6B, distribution 600 does not meet the second percentage-tolerance thresholds requirement, which is less than 1% of points are larger than ±88 microns. Brackets 625 and 630 indicate a substantial number of points (much larger than 1% of the total number of points) are larger than ±88 microns. Accordingly, based on this distribution of differences, QC module 215 can classify this part as a defective part.

QC module 215 can also quantify the defect by determining whether a distribution has more than one peaks. In distribution 600, there are two peaks, one on each side of the normal distribution. As mentioned, these peaks indicate the present of a step on the surface of dental prosthesis 450. To quantify the steps, QC module 215 determines the point in the distribution where the percent of points starts to increase again, starting from the middle (zero deviation). In distribution 600, the location where percent of points starts to increase again is at 635 and 640. For example, at 635, the percent of points went from 0.351% to 0.374%. This increase reverses the decreasing trend. For example, starting in the middle at negative 10 microns, the percent of points within negative microns is 19.036%. From there moving up the spreadsheet (in the negative direction), the percent of points decreases as we move up the spreadsheet. At 635, the percent of points started to increase again. In some embodiments, QC module 215 can classify the step based on where the percent increase occurs in the distribution. At 635, the offset value is 196 microns. Similarly, at 640, where the percent of points increases from 0.291% to 0.497%, the offset value is also 196 microns.

Figure 7:
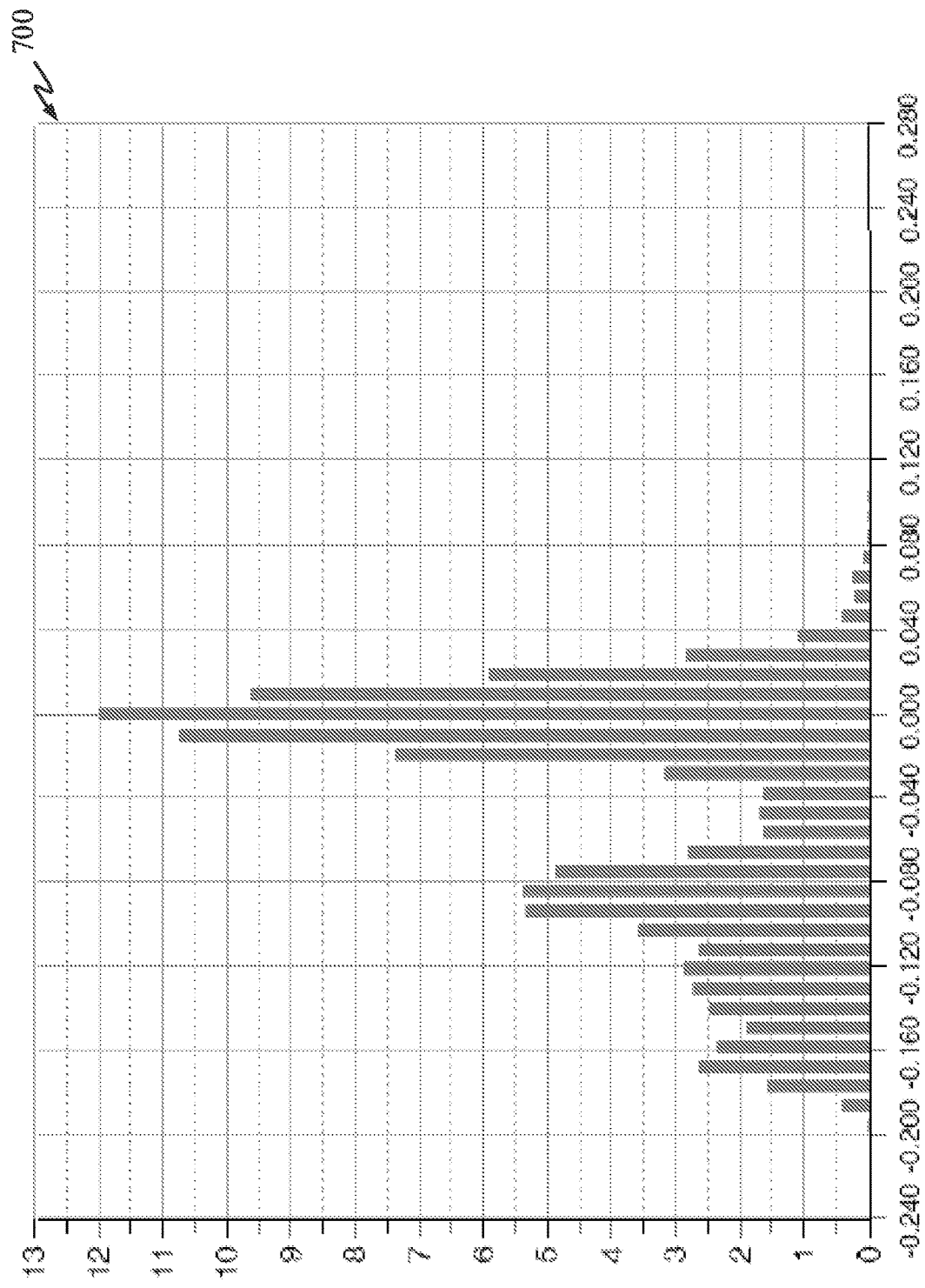
FIGS. 7 and 8 are example graphs illustrating the offsets distribution of differences models in accordance with some embodiments of the present disclosure.

FIG. 7 illustrates a distribution 700 of a differences model of a dental prosthesis that can be classified as being too small by QC module 215. To determine whether a manufactured dental prosthesis is too small or large, QC module 215 can analyze a distribution to determine whether the distribution is heavily biased toward the negative or positive side of the distribution curve. In FIG. 7, distribution 700 is heavily biased toward the negative side. In some embodiments, QC module 215 can classify a part to be a defective part if it is biased toward the negative or positive side of the curve. Additionally, QC module 215 can classify the dental prosthesis having distribution 700 to be a defective part because it appears that greater than 1% of the total points are outside of the ±88 microns.

Figure 8:
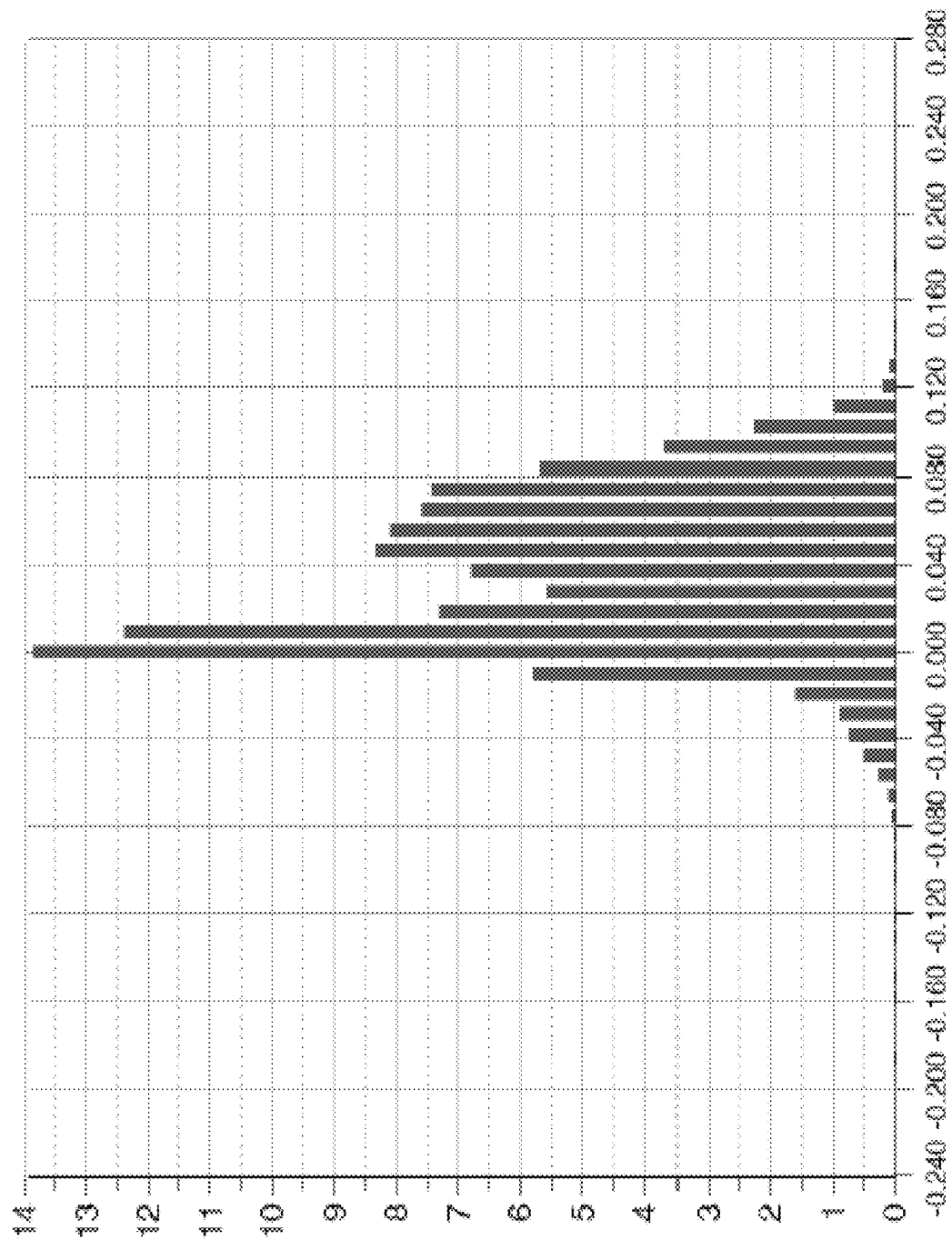

FIG. 8 illustrates a distribution 800 of a differences model of a manufactured dental prosthesis that can be classified as being too large by QC module 215. In distribution 800, a substantial number of points are located on the positive side of the distribution curve. This means that the dental prosthesis is likely too large. If the manufactured dental prosthesis (e.g., a crown) is too large, it would not fit properly into the prepared area inside the patient's mouth, e.g., the crown would not fit between the adjacent teeth or would have high occlusion. QC module 215 can also quantify the magnitude of size defect (too small or too large) by determining the percent of points in the biased portion of the curve. The average, mean, or median value of those points can be determined to quantify the size of the defect.

Figure 9:
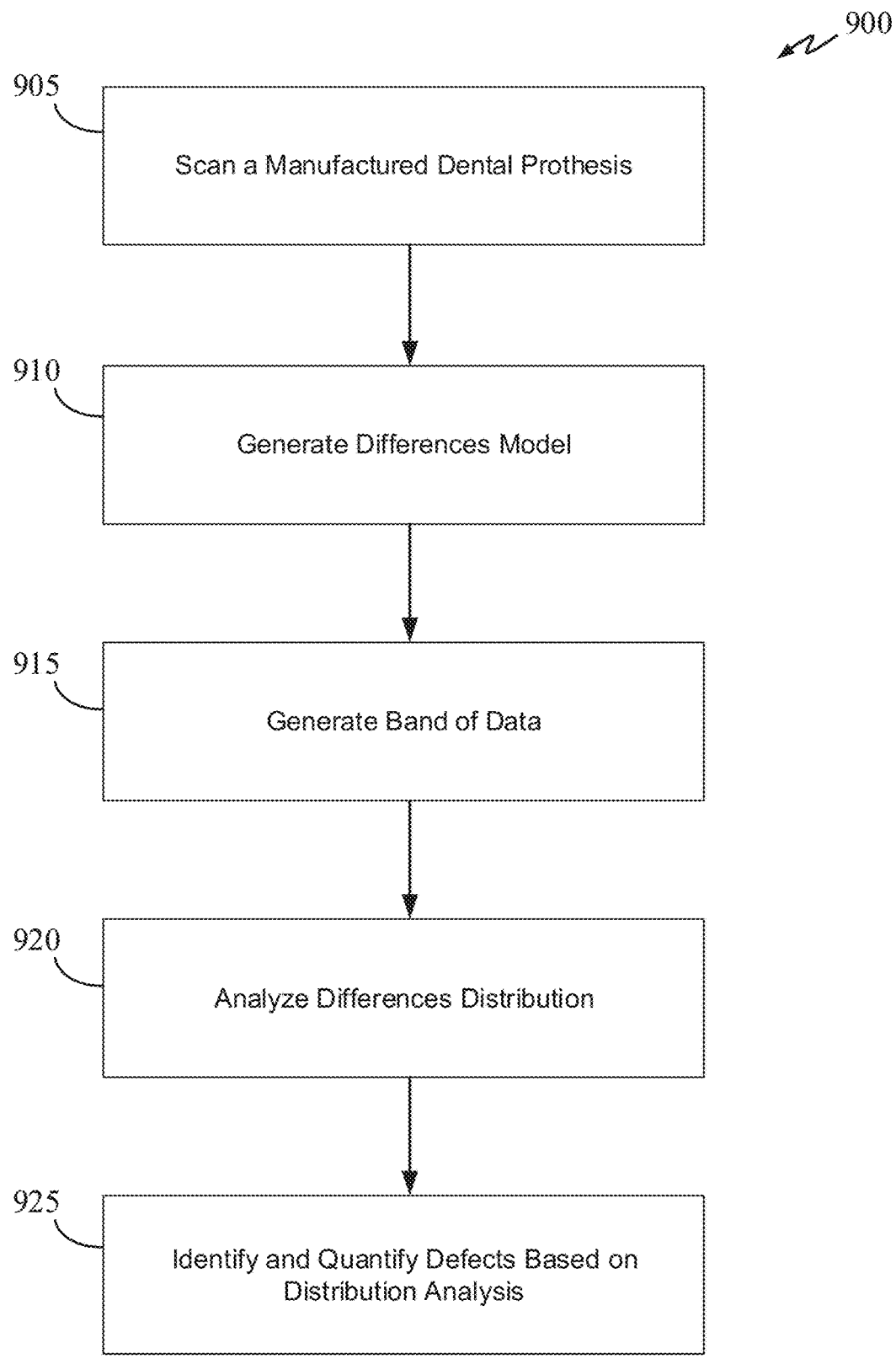
FIG. 9 is a flow diagram of a quality control process in accordance with some embodiments of the present disclosure.

FIG. 9 is a flow diagram of a quality control process 900 in accordance with some embodiments of the present disclosure. Process 900 starts at block 905 where a manufactured dental prosthesis is scanned to generate a 3D data set. At block 910 a differences (offsets) model is generated by best fitting the scanned 3D data set of the manufactured dental prosthesis with a CAD data set of the same. A differences model is a collection of offset data between points in the CAD model and corresponding best-fitting points in the scanned 3D data set. An ideal differences model comprises of zero offset points.

Figure 10:
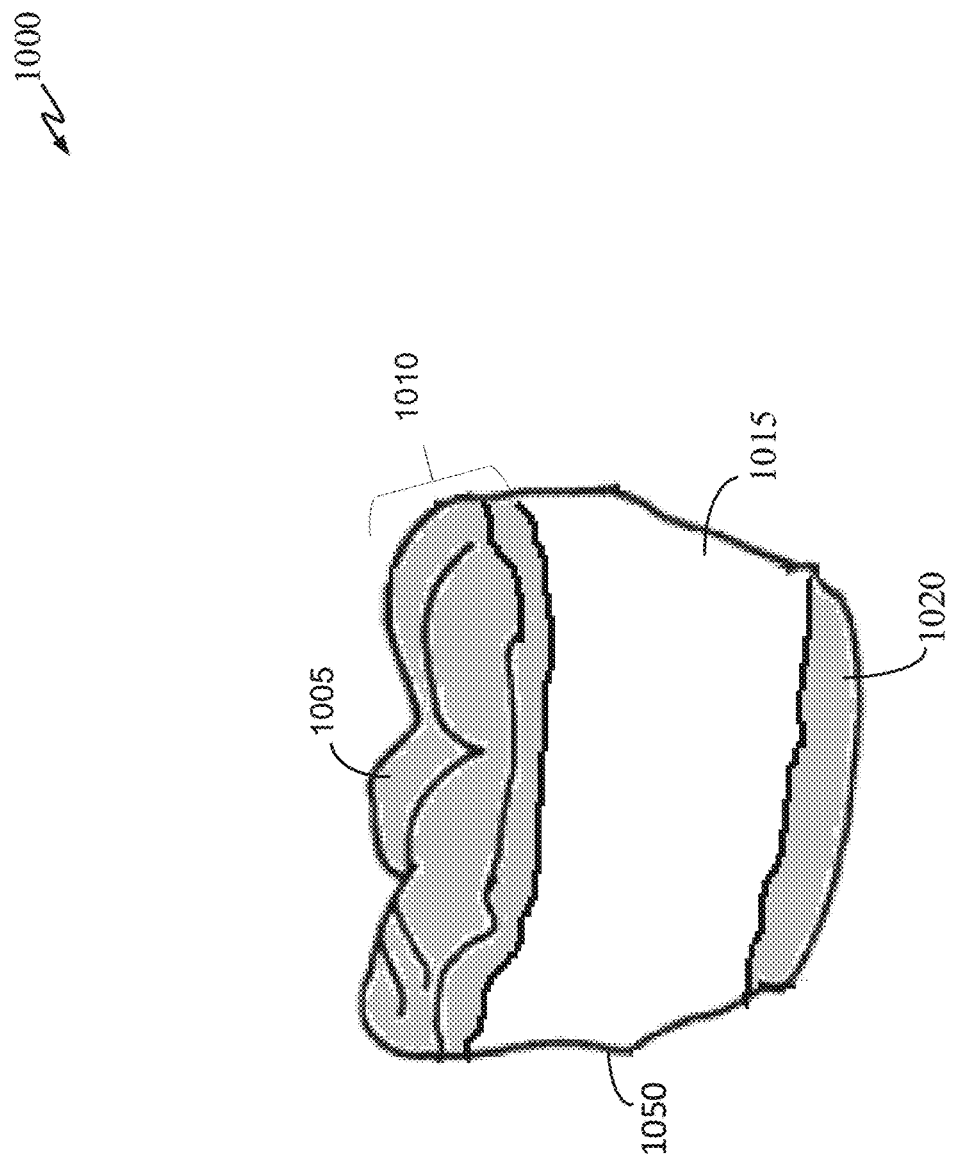
FIG. 10 illustrates a dental crown and a reliable data band in accordance with some embodiments of the present disclosure.

At block 915, a band of data is generated prior to performing statistical analysis on the distribution of differences of the differences model or data set. The band of data is generated by eliminating a top and/or a bottom portion of the differences model from the statistical analysis. FIG. 10 illustrates a differences model of a crown 1000 having the band of data in accordance with some embodiments of the present disclosure. Crown 1000 includes an occlusal surface 1005, a top portion 1010, a middle portion 1015, and a bottom portion 1020. To generate a band of data 1050 that can be reliably used for statistical analysis, points located in top portion 1010 can be eliminated from the data set for statistical analysis. In some embodiments, points located in both top portion 1010 and bottom portion 1020 can be eliminated from the data set for analysis. Alternatively, only points in the top or bottom portion are eliminated from the data set. After the points in the top and bottom portions are removed (or simply not included in the analysis), band of data 1050 is generated. Band of data 1050 is reliable because it does not include variabilities inherent in occlusal surface 1005 and along the margin line (the bottom edge of bottom portion 1020). Additionally, a dental prosthesis can have a height tolerance of ±30 microns. Thus, by eliminating bottom portion 1020 from the statistical analysis, the height variation of the dental prosthesis is removed. This reduces the overall variability of the data set and thereby making it more reliable.

Referring again to FIG. 9, after the band of data is generated, the distribution of differences or offsets can be analyzed at block 920. Empirical studies show that using only data in band 1050 yield more accurate and consistent statistical results than using the entire differences data set of the generated differences model (at 910).

At block 925, various types of defect can be identified and quantified based on the analysis of the distribution of the differences data set. For example, crown 1000 can be classified as being too small if its differences distribution is negatively biased. Alternatively, crown 1000 can be classified as being too large if its differences distribution is positively biased. In another example, a step in middle portion 1015 (see FIG. 10) can be identified if the distribution has two or more peaks. The step can also be quantified by analyzing where the distribution starts to increase on the left or right side of the distribution curve. For example, referring to FIGS. 6A and 6B, a step can be identified by the presence of peaks 610 and 615. Additionally, peaks 610 and 615 can be quantified by recognizing where in the distribution the percent distribution of points started to reverse and increase. In FIG. 6B, the point of percentage reversal for peak 610 occurs at 196 microns. Accordingly, the step can be quantified to have a height of approximately 200 microns.

Referring again to FIG. 2, 3D modeling module 210 can contain codes, instructions, and algorithms which when executed by a processor will cause the processor to perform one or more functions described in process 900 such as, but not limited to: perform a best fit of the CAD model of a dental prosthesis and a scanned 3D model of the same dental prosthesis (see block 910 of FIG. 9); and to generate a differences model based on the best fit (see also block 910).

QC module 215 can contain codes, instructions, and algorithms which when executed by a processor will cause the processor to perform one or more functions described in process 900 such as, but not limited to: generate a band of data; analyze differences distribution, and identify and quantify defects based on distribution analysis.

Figure 11:
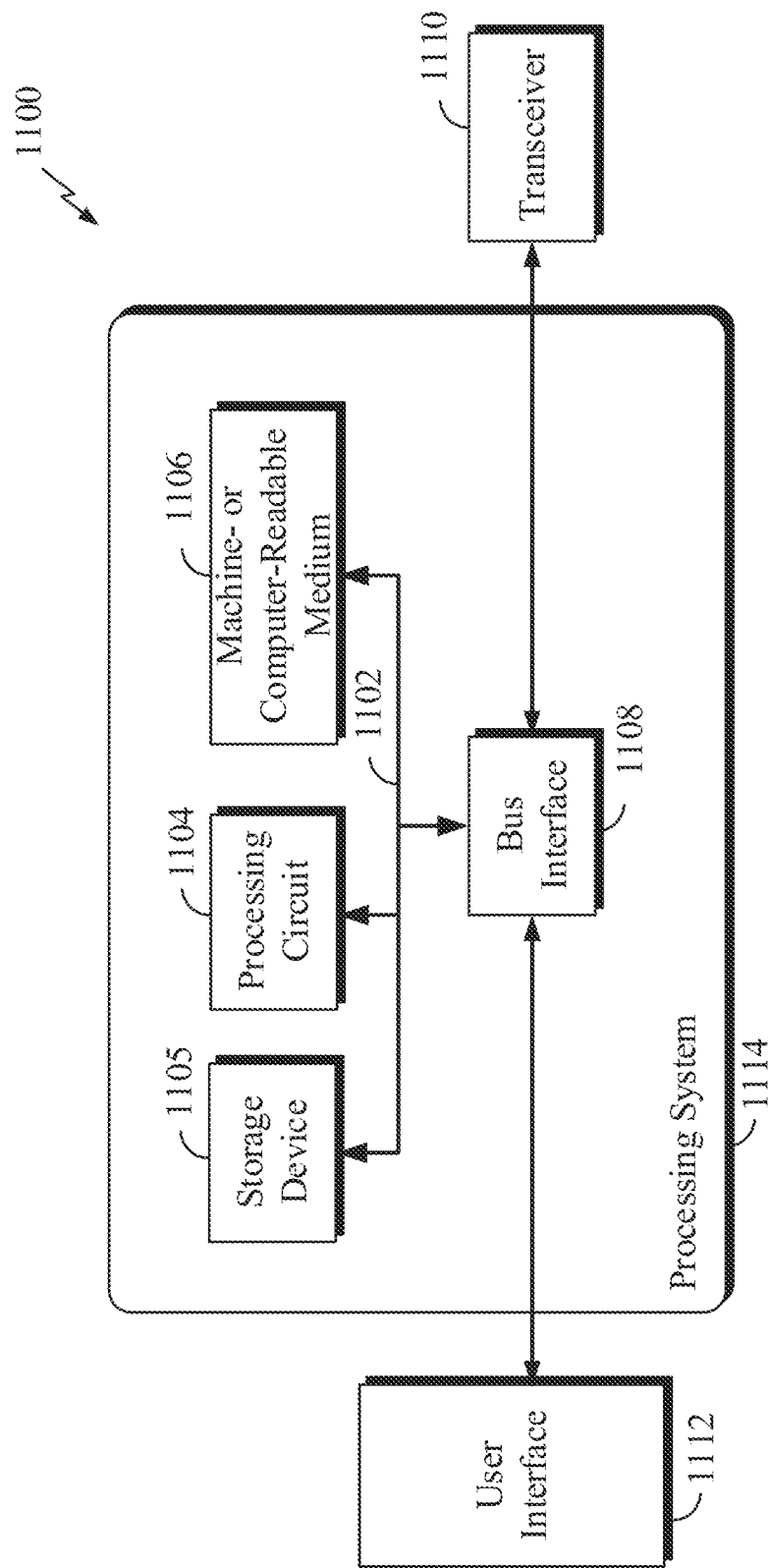
FIG. 11 is a system diagram that can be used to implement the system and method for performing quality control in accordance with some embodiments of the present disclosure.

FIG. 11 illustrates an overall system or apparatus 1100 in which modules 210 and 215 and process 900 can be implemented. In accordance with various aspects of the disclosure, an element, or any portion of an element, or any combination of elements may be implemented with a processing system 1114 that includes one or more processing circuits 1104. Processing circuits 1104 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104 may be used to implement any one or more of the processes described above and illustrated in FIGS. 4 through 9.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106.) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, touchscreen, motion sensor) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for performing quality control on manufactured dental prostheses, the system comprising:
   an analysis module to best fit spatial points of a scanned 3D data model of a manufactured dental prosthesis with corresponding best-fitting spatial points of a computer-aided design (CAD) model used to manufacture the dental prosthesis, and to generate a differences model comprising a compilation of offsets between the spatial points of the scanned 3D data model and the corresponding spatial points of the CAD model; and
   a quality controller to modify the differences model by trimming a bottom portion thereof near a margin line, and thereafter to determine whether the manufactured dental prosthesis is a good or a defective product based on a statistical characteristic of the modified differences model.

2. The system of claim 1, wherein the statistical characteristic comprises a differences distribution.

3. The system of claim 1, wherein the quality controller is further configured to trim a top portion of the differences model prior to determining the statistical characteristic of the differences model, wherein the top portion comprises an occlusal surface portion.

4. The system of claim 3, wherein the manufactured dental prosthesis is a good part when all offsets within ±50 microns account for greater than 85% of all points in the differences model.

5. The system of claim 3, wherein the manufactured dental prosthesis is a good part when all offsets within ±50 microns account for greater than 85% of all points in the differences model and all offsets greater than ±88 microns account for less than 1% of all points in the differences model.

6. The system of claim 3, wherein the manufactured dental prosthesis is a defective part when all offsets greater than ±88 microns account for greater than 1% of all points in the differences model.

7. The system of claim 3, wherein the manufactured dental prosthesis is a good part when all offsets within ±50 microns account for greater than 85% of all points in the differences model and all offsets greater than ±75 microns account for less than 1% of all points in the differences model.

8. The system of claim 3, wherein the manufactured dental prosthesis is a good part when all offsets within ±30 microns account for greater than 85% of all points in the differences model.

9. The system of claim 3, wherein the manufactured dental prosthesis is a good part when all offsets within ±70 microns account for greater than 85% of all points in the differences model.

10. The system of claim 1, wherein the analysis module is further configured to:
    determine a contact surface on the manufactured dental prosthesis that will be in contact with an adjacent tooth using the CAD model;
    determine whether points on the contact surface are within tolerance using the differences model; and
    reject the manufactured prosthesis based on a percentage of points outside of a predetermined tolerance.

11. The system of claim 1, further comprises:
    a scanner for scanning the manufactured dental prosthesis and for generating the scanned 3D data model.

12. The system of claim 10, wherein the scanner is configured to scan the manufactured dental prosthesis with light having a wavelength between 400-500 nm.

13. The system of claim 3, wherein the quality controller is configured to determine that the manufactured dental prosthesis is too small or large based on a distribution of differences that is negatively or positively biased.

14. The system of claim 3, wherein the quality controller is configured to determine that the manufactured dental prosthesis has a step when a distribution of differences includes peaks at a left and right side of a normal distribution curve.

15. A method for performing quality control on manufactured dental prostheses, the method comprising:
    scanning a manufactured dental prosthesis to generate a scanned 3D data model;
    generating a differences model by comparing spatial points of the scanned 3D data model of the dental prosthesis with corresponding best-fitting spatial points of a computer-aided design (CAD) model used to manufacture the dental prosthesis to determine a compilation of offsets between the spatial points of the scanned 3D data model and the corresponding best-fitting spatial points of the CAD model;
    trimming a bottom portion of the differences model near a margin line; and
    determining whether the manufactured dental prosthesis is a good or a defective product based on a statistical characteristic of the differences model.

16. The method of claim 15, wherein the statistical characteristic comprises a differences distribution.

17. The method of claim 16, wherein determining whether the manufactured dental prosthesis is a good or a defective product further comprises determining the manufactured dental prosthesis is a good part when all offsets within ±50 microns account for greater than 85% of all points in the differences model.

18. The method of claim 16, wherein determining whether the manufactured dental prosthesis is a good or a defective product further comprises determining the manufactured dental prosthesis is a good part when all offsets within ±50 microns account for greater than 85% of all points in the differences model and all offsets greater than ±88 microns account for less than 1% of all points in the differences model.

19. The method of claim 16, wherein determining whether the manufactured dental prosthesis is a good or a defective product further comprises determining the manufactured dental prosthesis is a defective part when all offsets greater than ±88 microns account for greater than 1% of all points in the differences model.

20. The method of claim 16, wherein determining whether the manufactured dental prosthesis is a good or a defective product further comprises determining the manufactured dental prosthesis is a good part when all offsets within ±50 microns account for greater than 85% of all points in the differences model and all offsets greater than ±75 microns account for less than 1% of all points in the differences model.

21. The method of claim 16, wherein determining whether the manufactured dental prosthesis is a good or a defective product further comprises determining the manufactured dental prosthesis is a good part when all offsets within ±30 microns account for greater than 85% of all points in the differences model.

22. The method of claim 16, wherein determining whether the manufactured dental prosthesis is a good or a defective product further comprises determining the manufactured dental prosthesis is a good part when all offsets within ±70 microns account for greater than 85% of all points in the differences model.

23. The method of claim 15, further comprises:
determining a contact surface on the manufactured dental prosthesis that will be in contact with an adjacent tooth using the CAD model;
determining whether points on the contact surface of the manufactured dental prosthesis are within tolerance using the differences model; and
rejecting the manufactured prosthesis based on a percentage of points outside of a predetermined tolerance.

24. The method of claim 16, further comprises determining that the manufactured dental prosthesis is too small or too large based on a distribution of differences that is negatively or positively biased as compared to a normal distribution.

25. The method of claim 16, further comprises determining that the manufactured dental prosthesis has a step when a distribution of differences includes peaks at a left and right side of a normal distribution curve.

26. The method of claim 16, further comprises trimming a top portion of the differences model prior to determining the statistical characteristic of the differences model, wherein the top portion comprises an occlusal surface portion.

* * * * *